(12) United States Patent
Deng

(10) Patent No.: US 10,969,558 B2
(45) Date of Patent: Apr. 6, 2021

(54) DISPLAY SCREEN ANTI-PEEPING GEAR AND SUPPORT MEMBER OF DISPLAY SCREEN PROTECTORS

(71) Applicant: Zhijun Deng, Guangdong (CN)

(72) Inventor: Zhijun Deng, Guangdong (CN)

( * ) Notice: Subject to any disclaimer, the term of this patent is extended or adjusted under 35 U.S.C. 154(b) by 266 days.

(21) Appl. No.: 15/918,556

(22) Filed: Mar. 12, 2018

(65) Prior Publication Data

US 2019/0204526 A1 Jul. 4, 2019

(30) Foreign Application Priority Data

Dec. 30, 2017 (CN) .......................... 201721924987.1

(51) Int. Cl.
| G03F 5/00 | (2006.01) |
| G02B 7/00 | (2021.01) |
| G06F 1/16 | (2006.01) |
| G03B 11/04 | (2021.01) |

(52) U.S. Cl.
CPC ................ *G02B 7/00* (2013.01); *G03B 11/04* (2013.01); *G06F 1/1605* (2013.01); *G06F 1/1607* (2013.01); *G06F 1/1616* (2013.01); *G06F 1/1686* (2013.01)

(58) Field of Classification Search
CPC .. G02B 7/00; H04M 1/0266; H04M 1/72525; G06F 1/1605; G06F 1/1607; G06F 1/1616; G06F 1/1686; G03B 11/04; C09J 7/29; C09J 7/00; C09J 2201/122
USPC .......................................................... 359/893
See application file for complete search history.

(56) References Cited

U.S. PATENT DOCUMENTS

| 6,109,434 | A | * | 8/2000 | Howard, Jr. | .......... | G06F 1/1616 |
| | | | | | | 206/320 |
| 9,063,699 | B1 | * | 6/2015 | Huang | .................. | G06F 1/1643 |
| 9,369,170 | B2 | * | 6/2016 | Sorrentino | ............ | H04M 1/185 |
| 2002/0158967 | A1 | * | 10/2002 | Janick | .................... | G06F 1/1616 |
| | | | | | | 348/87 |
| 2007/0153119 | A1 | * | 7/2007 | Bilbrey | ................ | H04N 5/2254 |
| | | | | | | 348/373 |
| 2007/0247800 | A1 | * | 10/2007 | Smith | ................... | G06F 1/1692 |
| | | | | | | 361/679.02 |
| 2012/0183713 | A1 | * | 7/2012 | Leonhard | .............. | G06F 1/1637 |
| | | | | | | 428/41.7 |
| 2013/0063550 | A1 | * | 3/2013 | Ritchey | ................ | G06F 1/1626 |
| | | | | | | 348/36 |
| 2013/0265644 | A1 | * | 10/2013 | Armstrong | ............ | G06F 1/1637 |
| | | | | | | 359/601 |
| 2014/0119718 | A1 | * | 5/2014 | Oh | ........................ | G03B 11/041 |
| | | | | | | 396/448 |
| 2014/0195826 | A1 | * | 7/2014 | Wojcik | .................... | G06F 21/86 |
| | | | | | | 713/300 |

(Continued)

FOREIGN PATENT DOCUMENTS

| JP | 3220547 U | * | 3/2019 | ........... | G06F 1/1607 |
| WO | WO-2019145007 A1 | * | 8/2019 | ............ | H04M 1/185 |

*Primary Examiner* — William R Alexander
*Assistant Examiner* — Tamara Y. Washington
(74) *Attorney, Agent, or Firm* — Getech Law LLC; Jun Ye

(57) ABSTRACT

Aspects for a display screen anti-peeping gear are described herein. As an example, the aspects may include a screen protector; a support member arranged on the edge of the screen protector, wherein the support member is provided with a through-hole corresponding to the position of the display screen camera, and a cover arranged beside the through-hole which can close and open the through-hole.

10 Claims, 5 Drawing Sheets

(56) References Cited

U.S. PATENT DOCUMENTS

| | | | | |
|---|---|---|---|---|
| 2014/0198439 A1* | 7/2014 | De Pietro | G06F 1/1686 | 361/679.02 |
| 2014/0332417 A1* | 11/2014 | Wicks | H04B 1/3888 | 206/37 |
| 2015/0169089 A1* | 6/2015 | Dixon | H04B 1/3888 | 428/137 |
| 2015/0205327 A1* | 7/2015 | Daley, III | G06F 1/1698 | 361/679.03 |
| 2015/0215535 A1* | 7/2015 | Takahashi | G03B 11/04 | 348/375 |
| 2016/0107421 A1* | 4/2016 | Chung | B32B 7/14 | 428/41.8 |
| 2016/0116979 A1* | 4/2016 | Border | G06K 9/222 | 345/156 |
| 2016/0147254 A1* | 5/2016 | Daley, III | G06F 1/1616 | 348/725 |
| 2016/0154426 A1* | 6/2016 | Daley, III | G06F 1/1698 | 361/679.03 |
| 2016/0320795 A1* | 11/2016 | Daley, III | G06F 1/1628 | |
| 2017/0091515 A1* | 3/2017 | Cao | G06F 3/021 | |
| 2017/0094039 A1* | 3/2017 | Lu | H04M 1/0266 | |
| 2018/0008044 A1* | 1/2018 | Holt | G06F 1/1637 | |
| 2018/0059510 A1* | 3/2018 | Gustaveson, II | G03B 11/04 | |
| 2018/0129829 A1* | 5/2018 | Li | G06F 21/84 | |
| 2018/0167707 A1* | 6/2018 | Osterhout | G06F 1/163 | |
| 2018/0197157 A1* | 7/2018 | Magee | G06Q 20/1085 | |
| 2018/0246543 A1* | 8/2018 | Shelmet, Sr. | G06F 1/1607 | |
| 2018/0276418 A1* | 9/2018 | Li | G06F 21/6245 | |
| 2018/0309867 A1* | 10/2018 | Sabin | G06F 3/013 | |
| 2019/0138737 A1* | 5/2019 | Leipold | G06F 1/1637 | |
| 2019/0179212 A1* | 6/2019 | Leimer | G03B 11/043 | |
| 2019/0204526 A1* | 7/2019 | Deng | G02B 7/00 | |
| 2019/0272005 A1* | 9/2019 | Wickett | G06F 1/1686 | |
| 2020/0090662 A1* | 3/2020 | Castro | G06F 1/1656 | |
| 2020/0097053 A1* | 3/2020 | Renda | H04R 1/028 | |
| 2020/0159305 A1* | 5/2020 | Bartscherer | G06F 1/3206 | |

* cited by examiner

DISPLAY SCREEN ANTI-PEEPING GEAR AND SUPPORT MEMBER OF DISPLAY SCREEN PROTECTORS

TECHNICAL FIELD

This Disclosure involves the peripheral gear of display screen, more particularly; it includes a display screen anti-peeping gear and the support member of display screen protectors.

BACKGROUND

Anti-peeping film is a kind of semi-rigid film of plastic material, about 0.05 mm-5 mm thick, the main role of which is to narrow the visual angle scope of the display screen, in order to avoid the information displayed on the screen from being peeped by people around, for protection of personal privacy and commercial confidentiality, and anti-peeping film is mostly used for notebook computer.

The use of anti-peeping film can effectively avoid the information displayed on the screen from being peeped by people around. But for some screens with cameras (such as notebook computers), because hackers can remotely control the cameras that open computers, there still exist hidden dangers of privacy leakage.

In addition, the existing method of mounting the display screen anti-peeping film is usually to fix the anti-peeping film on the front side of the display screen by adhesive method or suspension method. The adhesive method has defects such as unreliable bonding after it has been used for multiple times, and it is not easy to remove glue on the screen frame. It is unpleasantly suspended, and cannot be stably fixed.

SUMMARY

The purpose of this Disclosure is to provide a display screen anti-peeping gear to solve at least one of the above defects in the existing technology.

In order to realize the above purpose, this Disclosure adopts the following technical proposal:

A display screen anti-peeping gear comprises of the screen protectors and support member arranged on the edge of the screen protectors. The support member is provided with a through-hole corresponding to the position of the display screen camera, and a cover is arranged beside the through-hole which can close and open the through-hole.

In the display screen anti-peeping gear above, preferably, the support member is composed of two relatively long strip splints. The edge of the screen protector is fixed between the two strip splints, and at least one splint has a micro-absorbent adhesive layer.

In the display screen anti-peeping gear above, preferably, at least one of the splints is composed of micro-absorbent adhesive material.

In the display screen anti-peeping gear above, preferably, the screen protector includes anti-peeping film, protective film or lens.

In the display screen anti-peeping gear above, preferably, one side of through-hole on the support member is arranged with the accommodating groove; the cover is arranged at the position inside the accommodate groove that can slide to close the through-hole; the cover is provided with the convex part, and the convex part protrudes into the chute on the support member.

In the display screen anti-peeping gear above, preferably, one side of through-hole on the support member is arranged with the accommodating groove; the mounting pin is arranged between the accommodating groove and the through-hole and the cover is eccentrically mounted on the mounting pin that can swing around the mounting pin into the accommodating groove or close the through-hole; the cover is provided with the convex part, and the convex part protrudes into the chute on the support member.

This Disclosure also provides the support member of display screen protectors; the support member is composed of two relatively long strip splints, and at least one splint has a micro-absorbent adhesive layer. The support member is provided with a through-hole corresponding to the position of the display screen camera, and a cover is arranged beside the through-hole which can close and open the through-hole.

In the above support member of display screen protectors, preferably, at least one of the splints is composed of micro-absorbent adhesive material.

In the above support member of display screen protectors, preferably, one side of through-hole on the support member is arranged with the accommodating groove; the cover is arranged at the position inside the accommodate groove that can slide to close the through-hole; the cover is provided with the convex part, and the convex part protrudes into the chute on the support member.

In the above support member of display screen protectors, preferably, one side of through-hole on the support member is arranged with the accommodating groove; the mounting pin is arranged between the accommodating groove and the through-hole and the cover is eccentrically mounted on the mounting pin that can swing around the mounting pin into the accommodating groove or close the through-hole; the cover is provided with the convex part, and the convex part protrudes into the chute on the support member.

Compared with the existing technology, this Disclosure has at least the following beneficial effects:

Because the support member of the screen protector is arranged with the through-hole and cover, when the camera is not used, the through-hole can be closed with the cover to cover the camera lens, which can effectively prevent hackers from remotely controlling the camera to peep privacy.

DETAILED DESCRIPTION

The following is a further description of this Disclosure combining with the attached figures and the examples.

Figure 1:
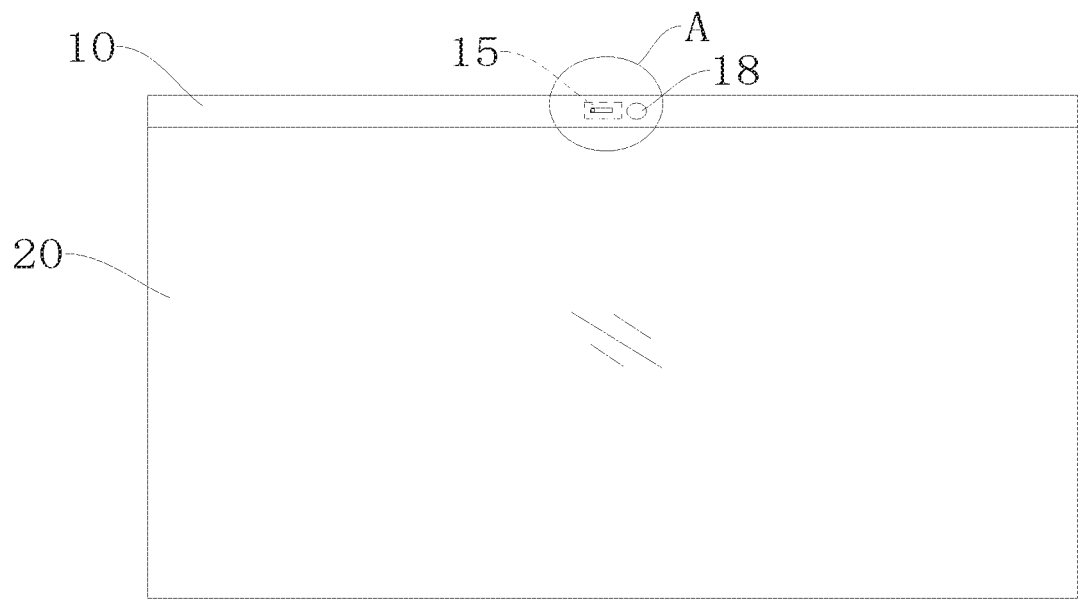
FIG. 1 is the schematic diagram of the structure of the display screen anti-peeping gear in the first example.

Referring to FIG. 1, the display screen anti-peeping gear in the first example includes screen protector (20) and support member (10) arranged at the edge of the screen protector (20). The support member (10) is provided with a through-hole (18) corresponding to the position of the display screen camera, and a cover (15) is arranged beside the through-hole (18) which can close and open the through-hole (18). Among which, the screen protector (20) is anti-peeping film.

When in use, the support member 10 is combined with the frame of the display screen to support the anti-peeping film at the front of the display screen on one hand to narrow the scope of the display screen so as to avoid the information displayed on the screen from being peeped by people around for protection of personal privacy and commercial secrets; on the other hand, the support member 10 supports the cover 15 at the position of the camera of the display screen, when the camera is not used, the through-hole 18 can be closed with the cover 15 to cover the camera lens, which can effectively prevent hackers from remotely controlling the camera to peep privacy.

Figure 2:
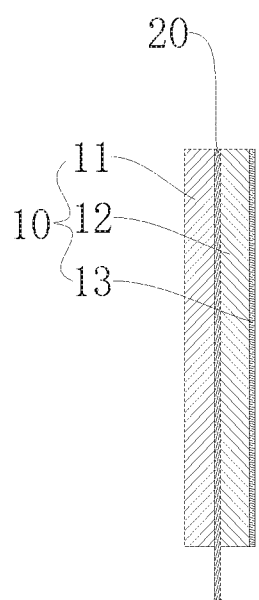
FIG. 2 is the schematic diagram of the structure of support member in the first example.

Referring to the FIG. 2, supporting member 10 is composed of two long strip splints 11 and 12 set opposite with each other. The edge of the screen protector 20 (anti-peeping film) is fixed between the two strip splints 11 and 12, and the splint 12 has a micro adhesive layer 13. In the application, the support member 10 is attached to the frame of the display screen by the micro absorptive layer 13. The micro absorptive glue can be adsorbed on the smooth surface and can be reused indefinitely. It has the characteristic of long service life. With the structure, the anti-peeping film can be flatly fixed on the front side of the display screen, used for a long time, and it will not leave stains on the screen frame.

Figure 3:
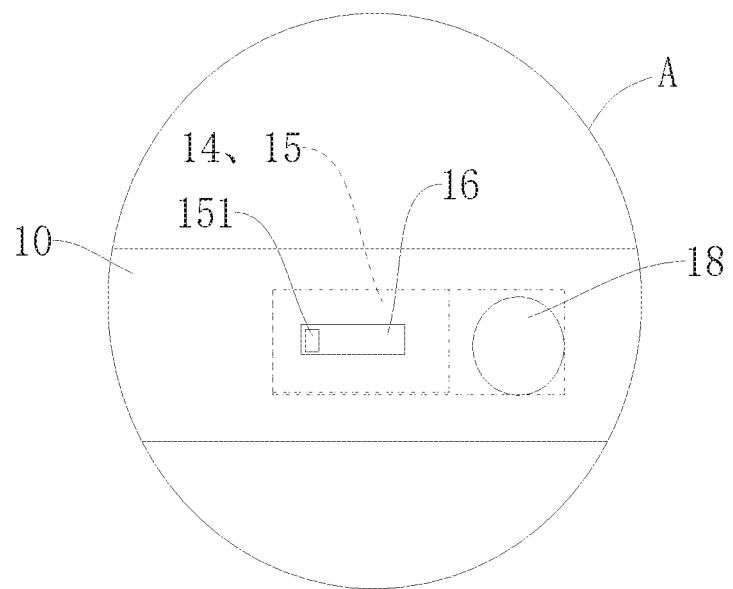
FIG. 3 is the magnifying map of Part A in FIG. 3.

Referring to FIG. 3, one side of the through-hole 18 on the support member 10 is arranged with an accommodating groove 14, in which the cover 15 is arranged to slide to close the through-hole 18; the cover 15 is provided with a convex part 151 for toggling, and the convex part 151 protrudes into the sliding groove 16 on the support member 10. By toggling the convex part 151 to slide the cover 15 to the left/right, the through-hole 18 can be opened/closed to expose/shield the camera of the display screen.

Figure 4:
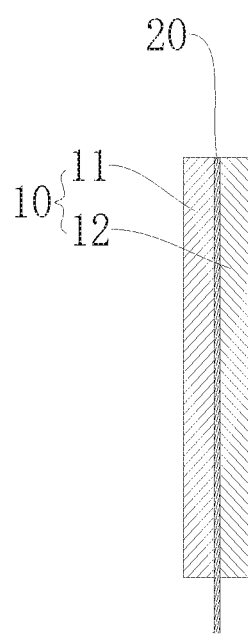
FIG. 4 is the schematic diagram of the structure of support member in the second example.

A support member 10 of another kind of structure is adopted in the second example. As shown in FIG. 4, the support member 10 in the second example is composed of two strip splints 11 and 12 set opposite with each other, the edge of the screen protector 20 (anti-peeping film) is fixed between the two strip splints 11 and 12, and the strip splint 12 is composed of micro adhesive glue material. Another splint 11 is as a decorative plate, which can be composed of either micro adhesive glue material or other materials. In the application, the support member 10 can be attached to the frame of the display screen directly through the splint 12.

In the above two examples, the support member can be attached to the frame of the display screen through the micro adhesive glue. As another example, the hanging hook can be set on the supporting member; the hanging hook is connected with the upper end of the display screen to fix the support member 10 on the display screen. In addition, the magnetic absorption method or other existing combination method can be used.

Figure 5:
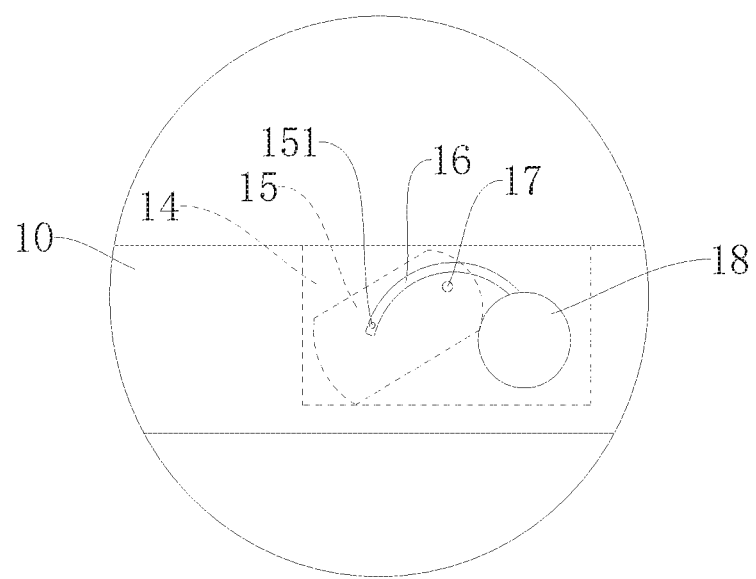
FIG. 5 is the schematic diagram of the structure of through-holes and the cover in the third example.

The mounting structure of another kind of cover is used in the third example. Referring to FIG. 5, one side of the through-hole 18 on the support member 10 is arranged with accommodating groove 14, and the mounting pin 17 is arranged between accommodating groove 14 and through-hole 18, the cover 15 is eccentrically installed on mounting pin 17 where it can swing around the mounting pin 17 into the accommodating groove 14 or close the through-hole 18, the cover 15 is provided with convex part 151 for toggling, and the convex part 151 protrudes into the sliding groove 16 on the support member 10. By toggling the convex part 151 to drive the cover 15 to move around the mounting pin 17, the through-hole 18 can be opened/closed to expose/shield the camera of the display screen.

In addition, as some other examples, the screen protector 20 can also adopt various protective films or lenses, such as radiation-proof films or lens, etc.

The disclosure is explained in detail through the above-mentioned specific examples. These detailed instructions are only for helping technicians in this field understand the contents of the disclosure, but cannot be interpreted as limiting the scope of protection of the disclosure. The polishing, equivalent transformation on the scheme made by technical personnel in the design of the disclosure should be included in the scope of protection of the disclosure.

It is a display screen anti-peeping gear and supporting member of screen protector. The display screen anti-peeping gear comprises of the display screen protector (20) and supporting member (10) arranged on the edge of the screen protector. The supporting member is provided with a through-hole (18) corresponding to the position of the display screen camera, and a cover (15) arranged beside the through-hole which can close and open the through-hole. The supporting member of screen protector is composed of two long strip splints set opposite with each other, and at least one splint has a micro adhesive layer. The supporting member is provided with a through-hole corresponding to the position of the display screen camera, and a cover arranged beside the through-hole which can close and open the through-hole. When the camera is not used, the through-hole can be closed with the cover to cover the camera lens of the display screen, which can effectively prevent hackers from remotely controlling the camera to peep privacy.

The invention claimed is:

1. A display screen anti-peeping gear comprising:
 a screen protector adapted to be disposed facing a display screen;
 a support member arranged on the edge of the screen protector, the support member includes two strip splints, the edge of the screen protector is sandwiched between the two strip splints, wherein the support member is provided with a through-hole corresponding to the position of the display screen camera, and
 a cover arranged beside the through hole and configured to close and open the through-hole, wherein the cover prevents light from entering the through-hole when the cover closes the through-hole.

2. The display screen anti-peeping gear described in accordance with claim 1, wherein at least one strip splints has a micro-absorbent adhesive layer.

3. The display screen anti-peeping gear described in accordance with claim 2, wherein at least one of the splints is composed of micro-absorbent adhesive layer.

4. The display screen anti-peeping gear described in accordance with claim 1, wherein the screen protector is anti-peeping film, protective film, or lens.

5. The display screen anti-peeping gear described in accordance with claim 1,
 wherein one side of through-hole on the support member is arranged with an accommodating groove,
 wherein the cover is arranged at a position inside the accommodating groove that is configured to slide to close the through-hole, and
 wherein the cover is provided with a convex part, and the convex part protrudes into a chute on the support member.

6. The display screen anti-peeping gear described in accordance with claim 5, wherein one side of the through-hole on the support member is arranged with the accommodating groove, wherein a mounting pin is arranged between the accommodating groove and the through-hole, wherein the cover is eccentrically mounted on the mounting pin that is configured to swing around the mounting pin into the accommodating groove or close the through-hole, wherein the cover is provided with the convex part, and wherein the convex part protrudes into a chute on the support member.

7. A support member of a display screen protector comprising:

two strip splints, at least one splint has a micro-absorbent adhesive layer, wherein the support member is provided with a through-hole corresponding to a position of a display screen camera, and a cover arranged beside the through-hole and configured to close and open the though-hole, wherein the cover prevents light from entering the through-hole when the cover closes the through-hole.

8. The support member of display screen protectors in accordance with claim 7, wherein least one of the splints is composed of micro-absorbent adhesive material.

9. The support member of display screen protectors in accordance with claim 7, wherein one side of the through-hole on the support member is arranged with an accommodating groove, wherein the cover is arranged at the position inside the accommodating groove that is configured to slide to close the through-hole, wherein the cover is provided with a convex part, and wherein the convex part protrudes into a chute of the support member.

10. The support member of display screen protectors in accordance with claim 7, wherein one side of through-hole on the support member is arranged with an accommodating groove, wherein a mounting pin is arranged between the accommodating groove and the through hole, wherein the cover is eccentrically mounted on the mounting pin that is configured to swing around the mounting pin into the accommodating groove or close the through-hole, wherein the cover is provided with a convex part, and wherein the convex part protrudes into a chute of the support member.

* * * * *